United States Patent [19]
Gilmore et al.

[11] Patent Number: 5,186,517
[45] Date of Patent: Feb. 16, 1993

[54] SHIFTABLE/RELEASABLE MOUNT

[75] Inventors: Michael R. Gilmore; Anthony McConnell, both of Holland, Mich.

[73] Assignee: Prince Corporation, Holland, Mich.

[21] Appl. No.: 847,168

[22] Filed: Mar. 5, 1992

[51] Int. Cl.$^5$ .......................... B60R 13/02; B60R 7/04
[52] U.S. Cl. .................................... 296/214; 296/39.1; 296/37.7; 248/223.1; 52/511; 24/295; 24/701
[58] Field of Search ............ 296/214, 39.1, 39.3, 296/37.7; 248/223.1, 223, 222.4, 223.4, 224.1, 224.2, 224.4; 52/511; 24/295, 616, 701; 428/124, 126, 130

[56] References Cited

U.S. PATENT DOCUMENTS

| | | | |
|---|---|---|---|
| 1,387,312 | 8/1921 | Regenstein | 428/130 X |
| 3,216,166 | 11/1965 | Brown | 52/511 |
| 3,239,988 | 3/1966 | Meyer | 52/718 |
| 3,270,995 | 9/1966 | Shgars | 248/222.4 |
| 3,300,357 | 1/1967 | Doerfling | 296/214 X |
| 3,317,167 | 5/1967 | Becker et al. | 248/222.4 X |
| 3,445,979 | 5/1969 | Meyer | 52/718 |
| 3,635,519 | 1/1972 | Foster et al. | 296/214 X |
| 3,636,593 | 1/1972 | Buttriss et al. | 52/718 X |
| 3,642,317 | 2/1972 | Swindlehurst | 296/214 |
| 3,856,611 | 12/1974 | Markley | 428/126 |
| 3,876,246 | 4/1975 | Lutz et al. | 296/214 |
| 3,889,320 | 6/1975 | Koscik | 24/297 |
| 4,352,522 | 10/1982 | Miller | 296/214 |
| 4,642,859 | 2/1987 | Kaiser | 24/295 X |
| 4,644,612 | 2/1987 | Osterland | 24/295 |
| 4,861,183 | 8/1989 | Loos | 403/354 |
| 4,893,866 | 1/1990 | Dowd et al. | 296/214 |
| 4,893,867 | 1/1990 | Hilborn et al. | 296/214 |
| 4,913,484 | 4/1990 | Dowd et al. | 296/97.2 |
| 4,923,245 | 5/1990 | Kuwabara | 296/214 |
| 4,932,105 | 6/1990 | Muller | 24/297 X |
| 4,992,320 | 2/1991 | Gower | 296/214 X |
| 5,011,218 | 4/1991 | Danner et al. | 296/214 |

FOREIGN PATENT DOCUMENTS

| | | |
|---|---|---|
| 248240A | 9/1987 | European Pat. Off. . |
| 2941390 | 4/1981 | Fed. Rep. of Germany ...... 428/130 |
| 3527541 | 1/1985 | Fed. Rep. of Germany . |
| 58-71266 | 4/1983 | Japan . |
| 1-112110 | 11/1989 | Japan . |
| 2113632 | 8/1983 | United Kingdom . |

Primary Examiner—Dennis H. Pedder
Attorney, Agent, or Firm—Price, Heneveld, Cooper, DeWitt & Litton

[57] ABSTRACT

A fastening arrangement is provided for attaching components such as headliners, overhead consoles, or the like to vehicles. The arrangement includes a shaped slot in a first member which has a retaining end, a releasing end, and a neck with inclined protrusions therebetween, and a fastener attached to a second member and having an engaging leg portion constructed to be securely inserted directly and normally into the retaining end of the slot. Once installed, the fastener is securely held in the slot, but is releasable by forcing the engaging leg portion of the fastener past the inclined protrusion into the releasing end of the slot, whereat the component can be removed for servicing or repair. Also, a headliner is provided including a central portion with a perimeter, and a folded edge portion connected to the perimeter that presents a finished side along the perimeter so that the headliner can be installed into the vehicle roof without subsequent parts required to cover the perimeter. The headliner is particularly adapted for use with the fastening arrangement since it permits subsequent removal of the headliner for service, and later reinstallation without the use of new or separate parts.

23 Claims, 3 Drawing Sheets

SHIFTABLE/RELEASABLE MOUNT

BACKGROUND OF THE INVENTION

The present invention relates to a fastening arrangement to facilitate installation of components in a vehicle during mass production of the vehicles, and in particular to an arrangement which permits quick installation but later removal such as for servicing.

Vehicle manufacturers continue to search for ways to install components in the most time effective manner. One such method is to construct components that can be snapped into place. However, this has been met with some resistance on the basis that components that can be easily snapped in place also tend to easily fall out, causing increased warranty and customer dissatisfaction. At the same time, components that are hard to snap in place cause assembly problems, and further cause problems such as part breakage when an attempt is made to unsnap them for servicing. These problems are particularly prevalent over a large production run wherein all part variations and combinations of tolerances of the attaching arrangement must be securely attachable with a minimum of force, but which also must be made releasable for servicing same. Further, the arrangement must provide for secure reattachment of the component after servicing, preferably without the need for additional or new parts. Further in the case of a headliner, it is desirable to provide a part that is substantially complete as installed and does not require additional trim pieces to cover up edges of the headliner.

Thus, a fastening arrangement is desired which will provide quick assembly and secure retention under typical part dimensional variations and combinations, yet will permit later detachment for servicing and reattachment thereafter. Also, a headliner is desired which incorporates and takes full advantage of the fastening arrangement.

SUMMARY OF THE INVENTION

One aspect of the present invention is to provide a fastening arrangement for use in a vehicle to attach first and second members together. The fastening arrangement includes a shaped slot in the first member, the shaped slot defining a retaining end, a releasing end, and a neck therebetween. The fastening arrangement also includes a non-screw type fastener adapted to attach to the second member, the fastener including an engaging portion constructed to be inserted into the retaining end of the slot from a first direction normal to the plane defined by the slot whereat the engaging portion securely engages the retaining end once fully inserted therein. The slot includes retaining means for retaining the engaging portion of the fastener in the retaining end of the slot, but which can be overcome by moving the fastener in a second direction parallel to the plane through the neck into the releasing end of the slot whereat the fastener is released.

In another aspect, the invention is embodied in a headliner for a vehicle, the headliner including a composite sheet having a finish side and a back side, and further including a central portion defining a perimeter with an edge portion connected to the central portion by the perimeter. The perimeter includes a visible portion as installed, with the edge portion being folded along the perimeter so that the back side of the edge portion lies adjacent the back side of the central portion and so that the finish side extends along the visible edge of the perimeter for aesthetics. In the preferred embodiment, the composite sheet is formed into a three-dimensional shape including dimensionally thin portions along the perimeter which facilitate folding the composite sheet into the desired shape, and further including adhesive adhering the edge portions in the folded condition, and still further including notches formed along the edge portion so as to facilitate folding the edge portion into the folded condition without causing unacceptable bunching of the material in the edge portion.

The combination of the fastening arrangement and the headliner is advantageous in that a headliner can be snapped in place without the need to later cover the exposed and visible edges of the headliner, but which the headliner can be removed for repair without the need for new parts or fasteners upon reinstallation.

These and many other important advantages of the invention will be further understood and appreciated by those skilled in the art by reference to the following written specification, claims, and appended drawings.

DETAILED DESCRIPTION OF THE PREFERRED EMBODIMENTS

Figure 1:
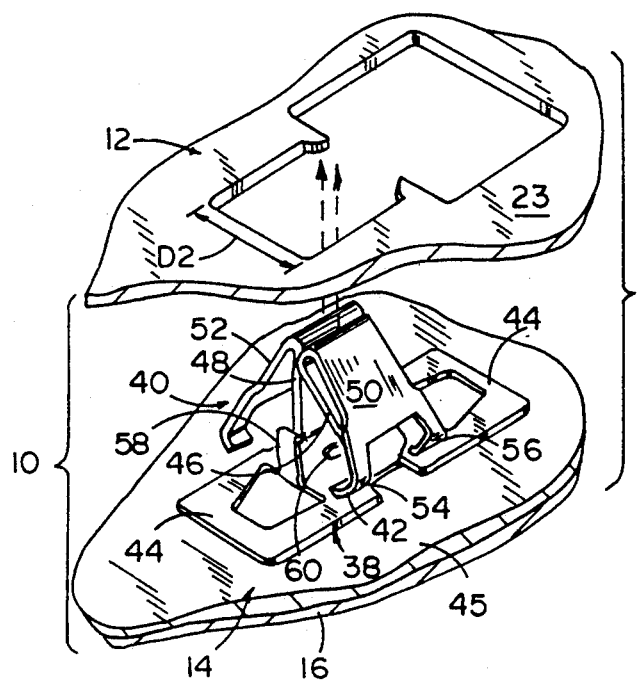
FIG. 1 is an exploded perspective view of a fastener arrangement embodying the present invention.
Figure 2:
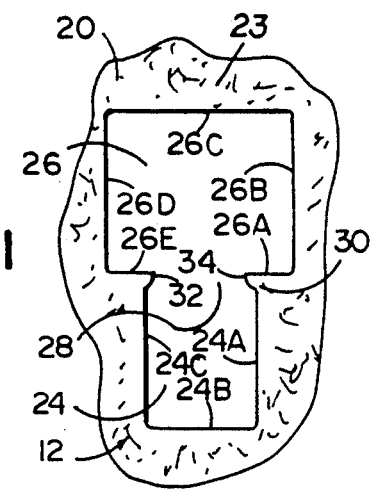
FIG. 2 is a plan view of the slot shown in FIG. 1.
Figure 3:
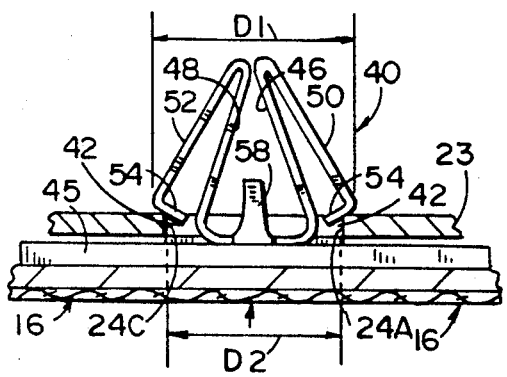
FIG. 3 is a sectional view taken along the plane III—III in FIG. 6.
Figure 13:
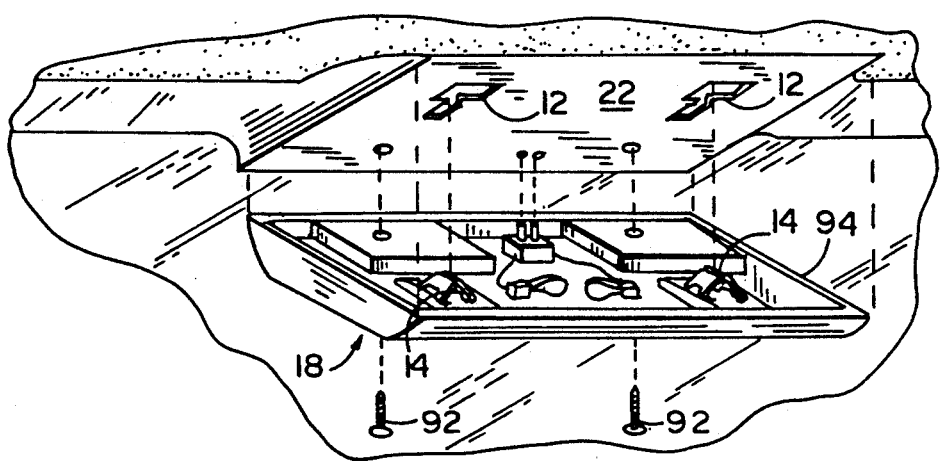
FIG. 13 is an exploded perspective view of a second embodiment of the invention.

A fastening arrangement 10 (FIG. 1) embodying the present invention includes a T-shaped slot 12 in one member 23, and a fastener 14 secured to a second member 16 and which can be securely snapped into a first end of slot 12, but which can be slid to an opposite end of slot 12 whereat fastener 14 is released from member 23. Fastening arrangement 10 is particularly adapted for attaching vehicle interior components such as a headliner 16 (FIGS. 1-12), overhead console 18 (FIG. 13) or similar vehicle interior parts where it is desired to provide quick installation with a minimum of tools, but where it may be necessary to remove the component at a later date for servicing. Fastening arrangement 10 is further adapted for reattachment of the vehicle interior components without the need for additional or new parts. Though only headliner 16 and overhead console 18 are shown, the invention is also contemplated as applicable to center armrest consoles, grab handles for doors, map lamps, and other similar interior vehicle parts.

T-shaped slot 12 can be formed in substantially any part having a space adjacent slot 12 to receive the operative end of fastener 14. In the illustrated embodiment shown in FIG. 8, multiple T-shaped slots 12 are located in the reinforcement braces 20 that extend supportingly across the inside of roof 22 of a vehicle. Four slots 12 are shown per brace 20, though any number can be used depending upon the need for multiple retentive locations. Brace 20 is formed from sheet metal, and includes a substantially planar sheet 23 wherein slot 12 is formed.

T-shaped slot 12 (FIG. 2) includes a retaining or narrow end 24 formed by edges 24A, 24B and 24C, a releasing or enlarged end 26 formed by edges 26A, 26B, 26C, 26D and 26E, and a neck 28 interconnecting same. Opposing protrusions 30 extend inwardly on neck 28, and include inclined surfaces or ramps 32 and 34 that are oriented inwardly at an angle from narrow end 24 toward enlarged end 26. Inclined surfaces 32 and 34 provide resistance to an object being forcibly moved from narrow end 24 toward enlarged end 26, but permit such movement as noted below.

Fastener 14 (FIGS. 1, 3 and 4) includes a base 38 and engaging portions comprising an inverted V-shaped ramp portion 40 which terminates adjacent base 38 at a connector means 42 located below and along the lower opposing edges of the ramp portion 40. Base 38 includes flanges 44 defining a planar mounting surface with sufficient surface area to spread a retentive force on fastener 14 to headliner 16 so that localized damage or distortion does not occur to headliner 16 during or upon installation of fastener 14 into slot 12. A patch 45 attached to base 38 and placed between fastener base 38 and headliner 16 further helps distribute stresses to headliner 16, though depending on the stiffness and integrity of the headliner material, it may not be required.

The ramp portion 40 is formed by the opposing webs 46 and 48 located centrally on base 38 and opposing ramps 50 and 52 connected to the terminal ends of webs 46 and 48. Webs 46 and 48, viewed in FIGS. 3 and 4 extend upwardly from opposing sides of base 38 but are angled slightly toward each other. Ramps 50 and 52 extend at an angle outwardly and toward base 38 forming the inverted V-shaped surface that can be snapped into retaining end 24 of slot 12. Both ramps 50 and 52 and also webs 46 and 48 are resilient so that ramps 50 and 52 can flex during installation. At the bottom of ramps 50 and 52 is connector means 42 which comprises inwardly bent lips 54 and 56. The engagement of lips 54 and 56 along the edges 24A and 24C establishes a dimension "D1" that is slightly larger than the dimension "D2" defined by the width of the retaining end 24 of slot 12. As installed, lips 54 and 56 are biased by the resiliency of webs 46 and 48 and ramps 50 and 52 against the edges 24A and 24C of narrow end 24 of slot 12 to secure fastener 14 in slot 12. To accomplish this end, the space between lips 54 and 56 and base 44 is less than the thickness of the sheet 23. A centering tongue 58 longitudinally extending upwardly from base 44 is provided to center fastener 14 in retaining end 24 of slot 12 by engaging edge 24B so as to prevent fastener 14 from being installed too close to edge 24B. Also, a screw hole 60 with a flange-like thread for engaging the threads of an attachment sheet metal screw (not shown) is centrally located between webs 46 and 48 on base 38.

In use, fastener 14 is attached to patch 45 and/or to headliner 16, such as by a screw, adhesive, staples, or the like. Headliner 16 is then positioned adjacent roof 22, with fasteners 14 arranged adjacent retaining ends 24 of slots 12 in roof brace 20. Headliner 16 is then installed by forcing and snapping fasteners 14 directly upwardly into retaining ends 24 of slots 12. When forced upwardly, fastener ramps 50 and 52 resiliently flex and slide on edges 24A and 24C of slot 12 until lips 54 and 56 operably engage edges 24A and 24C of slot 12 holding fastener 14 in place.

Figure 4:
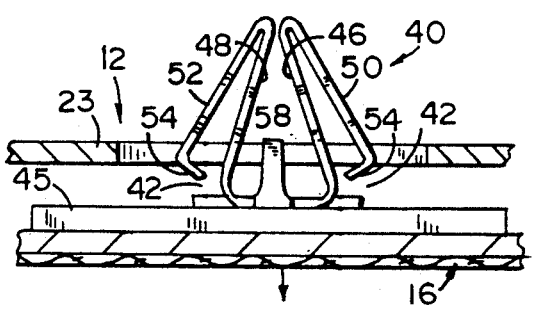
FIG. 4 is a sectional view taken along the plane IV—IV in FIG. 7.
Figure 5:
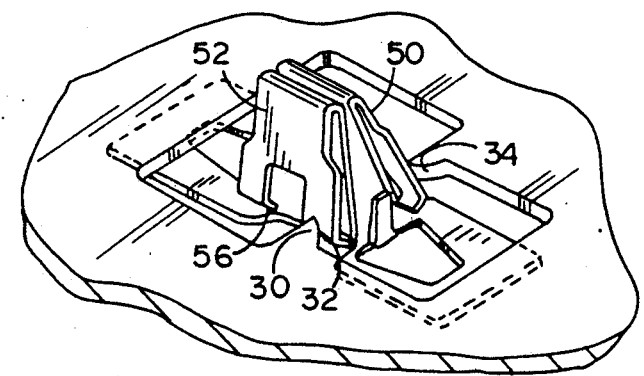
FIG. 5 is a perspective view of the fastener arrangement in FIG. 1 shown in an intermediate position between an installed/retained position and a released position.
Figures 6, 7:
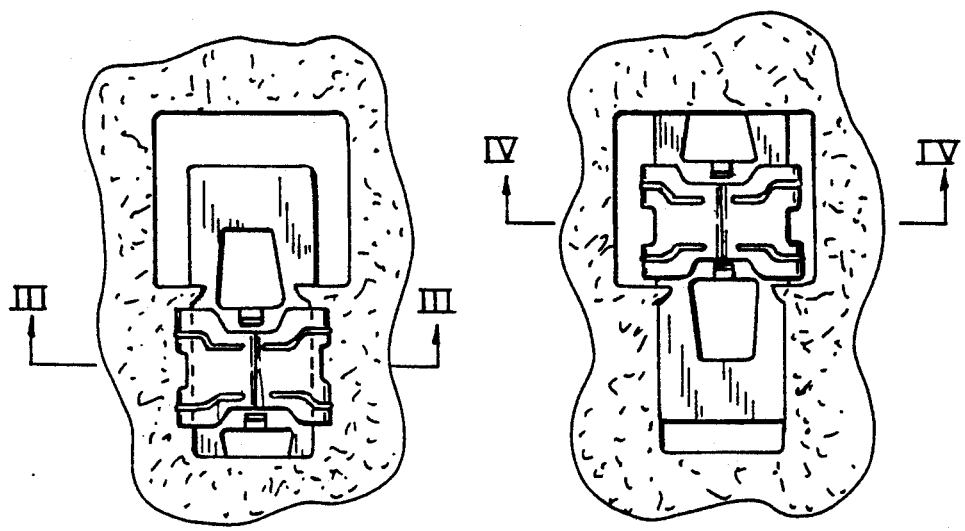
FIG. 6 is a plan view of the fastener arrangement in FIG. 5 but in the installed/retained position.
FIG. 7 is a plan view of the fastener arrangement in FIG. 5 but in the released position.
Figure 8:
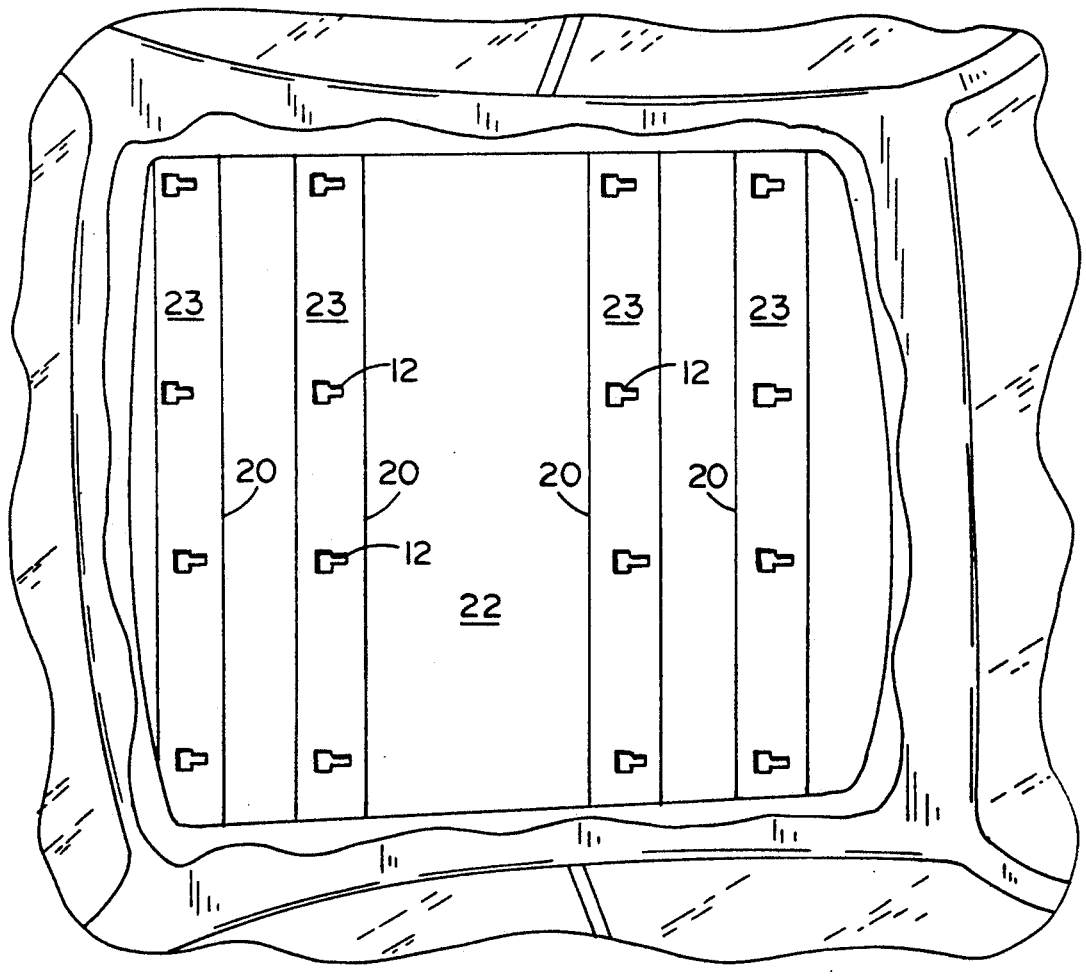
FIG. 8 is a plan view of the inner side of a vehicle roof.
Figure 9:
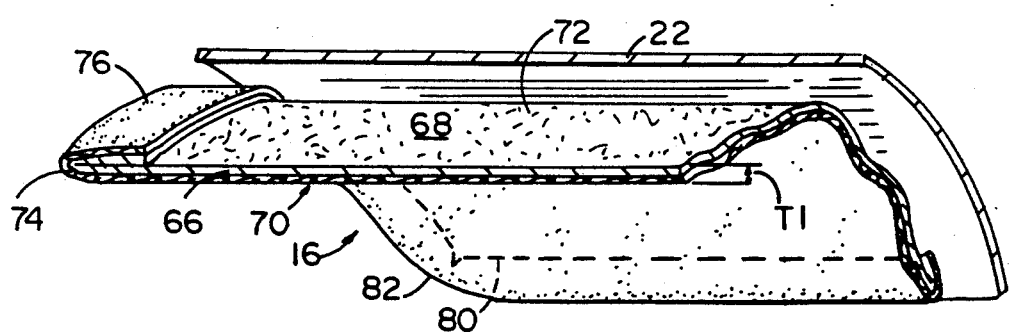
FIG. 9 is a perspective, cross-sectional view of a corner of a headliner.
Figure 10:
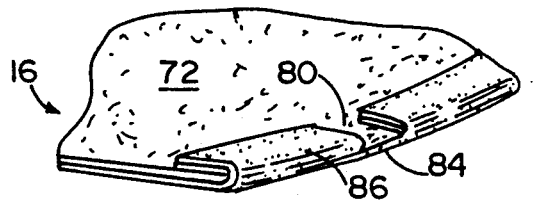
FIG. 10 is a second perspective, cross-sectional view of a side portion of a headliner.
Figure 11:
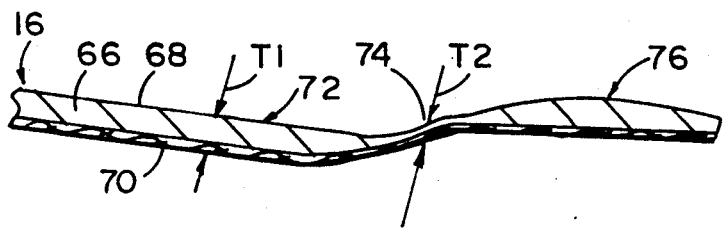
FIGS. 11 and 12 are elevational, cross-sectional side views of a headliner before and after folding the edge portion of the headliner.
Figure 12:
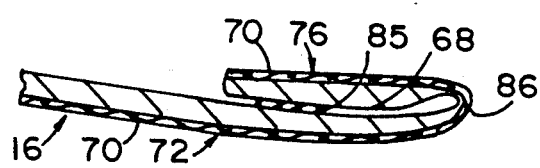

If it is necessary to remove headliner 16 such as for cleaning or for repair of other parts such as to repair a ding in the sheet metal of roof 22, headliner 16 can be removed as follows. Headliner 16 is urged forward such that fasteners 14 are moved from retaining end 24 of slot 12 (FIG. 3) toward the releasing end 26. As fasteners 14 slide into contact with inclined surfaces 32 and 34 of neck 28 (FIG. 5), ramps 50 and 52 are forced inwardly. This prevents accidental release of fasteners 14, but permits fasteners 14 to be forced into releasing end 26 of slot 12 if a sufficient force is applied. As fastener 14 enters releasing end 26, connector portion 42 disengages from slot 12, and headliner 16 falls loose so that it can be removed for repair (FIG. 4). Since slot 12, fastener 14, and the headliner 16 are undamaged by the removal, they can be reattached without the need for new parts or special tools.

Headliner 16 (FIGS. 9-12) is uniquely shaped to complement the snap-in feature permitted by fastener arrangement 10. Headliner 16 is a composite sheet made of a rigid foam material 66 with a glass fiber batting back layer 68 and a felt-like aesthetic outer layer 70 colored to compliment the vehicle interior. Headliner 16 includes a central portion 72 with a perimeter 74, and an edge portion 76 located therearound that is folded under central portion 72 in the finished part. Headliner 16 is molded into a three-dimensional shape with contours to match the vehicle roof 22, and in particular to match the edges of roof 22 as roof 22 wraps downwardly at the sides, front, and rear of the vehicle.

As molded, headliner 16 has a general thickness "T1" but includes a narrowed thickness "T2" along perimeter 74. Narrowed thickness "T2" helps confine the folds to perimeter 74 as edge portion 76 is folded under central portion 72. Further, perimeter 74 is particularly formed with a contour to place perimeter 74 adjacent roof 22 when fasteners 14 on the back side 68 of headliner 16 are engaged into slots 12.

Cuts extend from perimeter 74 outwardly across edge portion 76 to form one or more relief cutouts or notches 80. As edge portion 76 is folded inwardly so that the back layer 68 of edge portion 76 contacts the back layer 68 of central portion 72, notches 80 prevent unacceptable bunching of material such as at perimeter corner 82. Notches 80 also prevent bunching of folded edge portion 76 at concavely/convexly shaped areas such as perimeter convex portion 84. Edge portion 76 can thus be folded flat against back side 68 of headliner central portion 72, whereat adhesive 85 holds same in place. Notably, the outer visible folded edge 86 of headliner 16 is covered by aesthetic layer 70. Thus, headliner 16 presents an aesthetic appearance along all folded edges 86. This is particularly advantageous when used with fastener arrangement 10 since the headliner 16 can be snapped in place without the need to cover perimeter 74 by a trim piece (not shown).

Within a broader aspect of this invention, fastener arrangement 10 is not limited to be used only with a headliner, but can include overhead consoles, center armrest consoles, grab handles, map lamps, and other similar interior vehicle components that need to be quickly installed, by removably installed. As an example, a second embodiment (FIG. 13) is shown whereat the fastening arrangement is utilized to attach an overhead console 18 to the vehicle roof 22. Fasteners 14 can be secured to console 18 by a number of different ways such as by utilizing screws (not shown) threaded into holes 60 in fastener 14, adhesive, or other means known in the art. Also, if desired, one or more screws 92 can be used to secure console 18 to roof 22 to provide a more secure attachment and to prevent accidental movement and release of console 18. Console 18 includes an outer ridge 94 that is mateably shaped to contact the headliner or other part that it is placed against.

Thus, it is seen with the fastening arrangement of the present invention, a compact, convenient and secure retention system is provided for readily installing components in a vehicle and one in which the components can be removed for repair and reinstalled without additional parts. In the preferred embodiment of the invention, the system is particularly-shaped and adapted to be used with a headliner, an overhead console, or other components attached to the interior of a vehicle. It will become apparent to those skilled in the art that various modifications to the preferred embodiment of the present invention can be made without departing from the spirit or scope thereof as defined by the appended claims.

The embodiments of the invention in which an exclusive property or privilege is claimed are defined as follows.

1. A fastening arrangement for use in a vehicle having a first member and a second member, comprising:

the first member having material defining a plane with an elongated shaped slot therein, said slot including longitudinal sides defining a retaining end, a releasing end and a neck therebetween;

a fastener attached to the second member, said fastener including an engaging portion constructed to be inserted by force into said retaining end in a first direction that is generally perpendicular to the plane, whereat said engaging portion securely engages said retaining end once fully inserted; and said neck including retaining means for retaining said engaging portion of said fastener in said retaining end of said slot, but which can be overcome by moving said fastener from said retaining end of said slot past said neck into said releasing end of said slot in a second direction generally perpendicular to said first direction whereat said fastener is released, whereby the second member can be attached to the first member by moving the second member so as to force said fastener into said retaining end of said slot in the first direction, and can be removed for repair by moving the second member and said fastener longitudinally in said slot into said releasing end in the second direction whereat the second member is released for removal of said second member from said first member.

2. A fastening arrangement as set forth in claim 1 wherein a spacing between the longitudinal sides of said retaining end defines a first distance that is less than a second distance defined by a spacing between the longitudinal sides of said releasing end.

3. A fastening arrangement as set forth in claim 1 wherein said retaining means of said slot includes at least one protrusion located between said retaining end and said releasing end on said slot, said protrusion including an inclined surface that narrows said neck as viewed from said retaining end toward said releasing end, said inclined surface acting as a ramp to resist movement of said fastener past said neck toward said releasing end, but simultaneously allowing said movement.

4. A fastening arrangement as set forth in claim 3 wherein said fastener includes a base, and further includes opposing legs, said legs forming said engaging portion.

5. A fastening arrangement as set forth in claim 4 wherein said opposing legs each include a ramp portion that is inclined so that said legs are compressed inwardly as said legs are inserted into said retaining end of said slot, and wherein said opposing legs further form inwardly bent lips for securely engaging said slot as said fastener reaches a fully inserted position.

6. A fastening arrangement as set forth in claim 5 wherein said base of said fastener has a planar shape and is attached to a headliner.

7. A fastening arrangement as set forth in claim 5 wherein the first member is part of the vehicle roof and includes a plurality of said shaped slots, and the second member is a headliner and includes a plurality of said fasteners positioned in locations corresponding to said plurality of shaped slots.

8. A fastening arrangement as set forth in claim 1 wherein the first member includes a plurality of said shaped slots and the second member includes a plurality of said fasteners positioned to engage said slots.

9. A fastening arrangement as set forth in claim 1 wherein the first member includes two of said slots, and the second member is an overhead console with at least two of said fasteners attached thereto in locations corresponding to said two slots.

10. A fastening arrangement as set forth in claim 9 including screw means for securely attaching said console to the roof, said screw means complementing said fastener and said shaped slot.

11. A fastening arrangement as set forth in claim 1 wherein said engaging portion of said fastener is a clip fashioned from spring steel.

12. A fastening arrangement for a first and second member comprising:

a shaped slot in the first member, said slot having a narrow end, an enlarged end, and a neck therebetween, said neck including at least one protrusion forming a ramp oriented from said narrow end toward said enlarged end; and a fastener attached to the second member, said fastener including a resilient engaging portion that can be inserted directly into said narrow end of said slot from a location other than said enlarged end to retain the second member to the first member, said resilient engaging portion being held in said narrow end by said ramp but releasable therefrom by forcing said resilient engaging portion past said ramp into said enlarged end whereat said fastener is released, whereby said second member can be attached to said first member simultaneously as said second member is moved toward said first member thus simplifying assembly of the second member to the first members but can be removed if necessary for repair of the second member by moving the second member laterally relative to the first member.

13. A fastening arrangement as set forth in claim 12 wherein said fastener includes a base and opposing resilient legs, said legs forming said engaging portion.

14. A fastening arrangement as set forth in claim 13 wherein said opposing legs each include a ramp portion that is inclined so that said legs are compressed inwardly as said legs are inserted into said narrow end of said slot, and wherein said opposing legs further form inwardly bent lips for securely engaging said slot as said fastener reaches a fully inserted position and said legs resiliently spring outwardly.

15. A fastening arrangement as set forth in claim 12 wherein said fastener includes a base that is planar in shape.

16. An arrangement for attaching a component to an overhead support int he passenger compartment of a vehicle, comprising:
  an arrangement of T-shaped slots located in the overhead support, each of said T-shaped slots including an enlarged end, a narrow end, and a neck therebetween, said neck including at least one protrusion forming a ramp oriented from said narrow end toward said enlarged end; and
  an arrangement of fasteners attached to the component and corresponding to said arrangement of T-shaped slots, said fasteners including resilient legs forming an inclined portion and a connector portion, each of said fasteners being insertable directly into said narrow end of said corresponding slots in a first direction with said inclined portion ramping into said narrow end so that said connector portion engages said narrow end once said inclined portion is fully inserted therein, the component being releasable by forcing each of said fasteners in a second direction toward said enlarged end of said slots causing said legs to slide over said ramp of said protrusion, said first direction and said second direction being oriented perpendicularly to each other.

17. A method of installing a component to and also removing the component from a vehicle, comprising:
  providing a component and vehicle having corresponding arrangements of fasteners and shaped slots, respectively, said shaped slots each having ends separated by an inclined protrusion, said fasteners being adapted to engage one end of said slots but releasable from another end of said slots;
  installing said component by inserting said fasteners directly into said one end of said slots in a first direction; and
  removing said component by forcibly moving said component in a second direction perpendicular to said first direction so that said fasteners move past said protrusion to said another end of said slots, whereat said fasteners are released and said component can be removed in a direction opposite said first direction.

18. A headliner for a vehicle having a roof, including:
  a composite sheet having a finished side and a back side, and further including a central portion defining a perimeter and an edge portion connected to said central portion by said perimeter, said perimeter including a visible edge, said edge portion being in a folded condition along said perimeter so that said back side of said edge portion lies adjacent said back side of said central portion and so that said finished side extends along said visible edge of said perimeter, said visible edge of said perimeter having a finished appearance without further covering or modification of said perimeter;
  means for holding said edge portion in said folded condition, whereby said headliner presents a finished appearance along said visible edge of said perimeter; and
  fasteners attached to said back side of said central portion and adapted to be inserted into T-shaped slots having a narrow end and an enlarged end separated by a narrowed neck in the vehicle roof, said fasteners being constructed to snap directly into the narrow end of said slots in the vehicle roof from a position other than said enlarged end, but said fasteners being adapted to be laterally moved over the narrowed neck to the enlarged end of said slots so that said headliner is removable after installation for repair.

19. A headliner as set forth in claim 18 wherein said means for holding said edge portion in said folded condition includes adhesive.

20. A headliner as set forth in claim 19 including cuts in said edge portion beginning proximate said perimeter and extending away therefrom so as to facilitate folding said edge portion into said folded condition without causing bunching of material in said edge portion.

21. A headliner as set forth in claim 20 wherein said composite sheet is formed into a three-dimensional shape including dimensionally thin portions along said perimeter which facilitate folding said composite sheet along said perimeter.

22. A headliner as set forth in claim 18 including cuts in said edge portion beginning proximate said perimeter and extending away therefrom, thus facilitating folding said edge portion into said folded condition without causing bunching of material in said edge portion.

23. A headliner as set forth in claim 18 wherein said composite sheet is formed into a three-dimensional shape including dimensionally thin portions along said perimeter which facilitate folding said composite sheet along said perimeter.

* * * * *